UNITED STATES PATENT OFFICE.

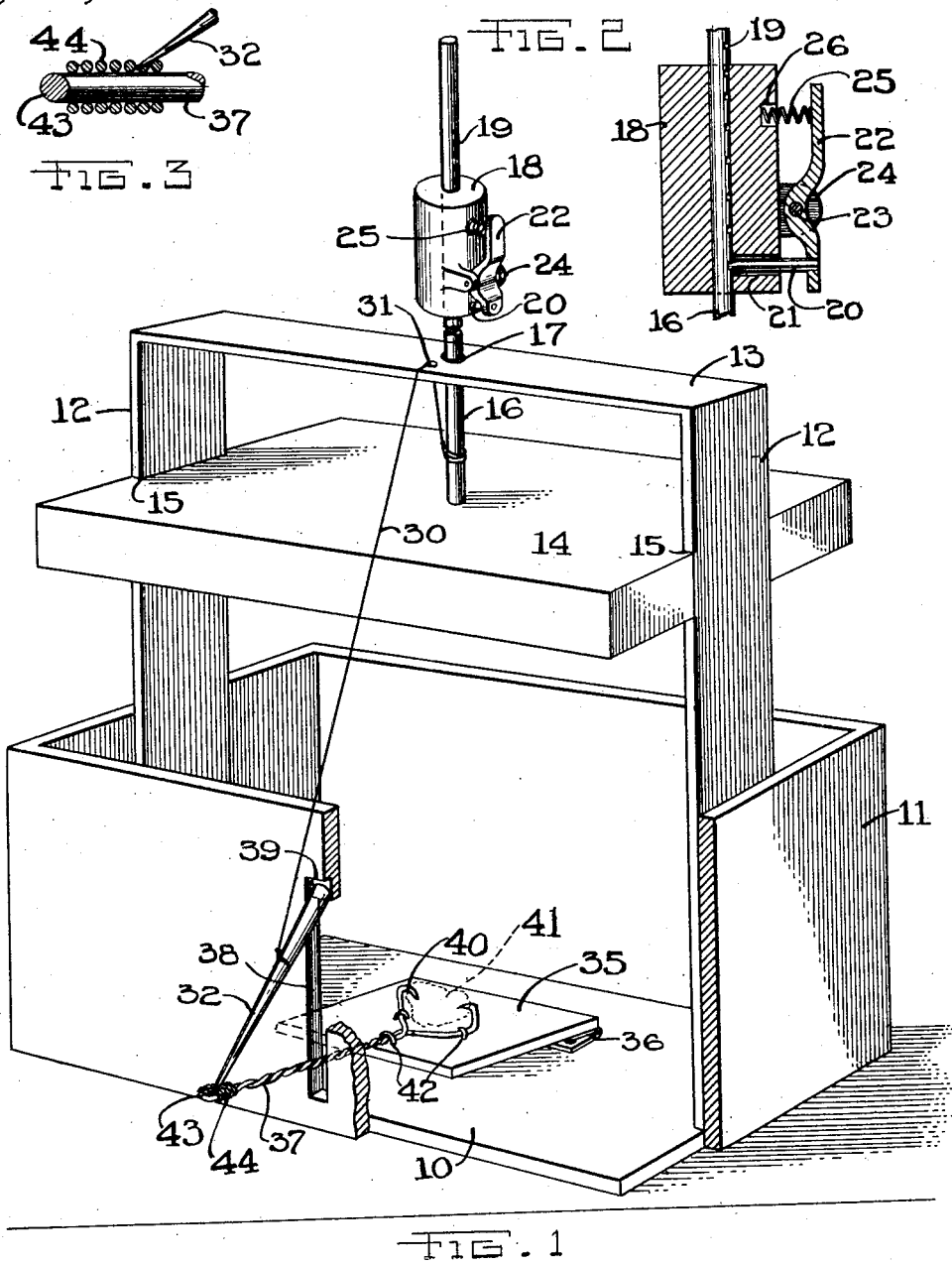

MICHAEL SHUTOFF, OF FREEHOLD, NEW JERSEY.

ANIMAL TRAP.

1,404,486.  Specification of Letters Patent.  Patented Jan. 24, 1922.

Application filed March 26, 1921. Serial No. 455,782.

*To all whom it may concern:*

Be it known that I, MICHAEL SHUTOFF, citizen of Russia, residing at Freehold, in the county of Monmouth and State of New Jersey, have invented certain new and useful Improvements in Animal Traps, of which the following is a specification.

This invention relates to animal traps, having more particular reference to a trap in which a suitably weighted member is held in raised position above the bait and is adapted to fall when the bait is disturbed.

The invention has for an object to provide a trap of this sort characterized by simplicity and cheapness of construction.

A further object of the invention is to provide novel means for weighting the said member and a novel arrangement of the bait holding member.

For further comprehension of the invention, and of the objects and advantages thereof, reference will be had to the following description and accompanying drawings, and to the appended claims in which the various novel features of the invention are more particularly set forth.

Fig. 1 of the drawings is a perspective view, with part of the cage member broken away, of a trap constructed according to the invention.

Fig. 2 is a detail vertical sectional view of the adjustable weight.

Fig. 3 is a detail vertical section showing the manner in which the bait holding device is engaged.

As here shown my improved trap comprises an open topped box having a bottom 10 and sides 11. Fixed to, and projecting upwardly from, opposite ends of the box are a pair of posts 12 whose upper ends are joined by a cross bar 13.

Slidably guided by the posts 12 is a plate 14 of an area to fit closely within the vertical walls of the box, this plate having grooves 15 extending vertically across the end edges thereof in which the posts 12 are accommodated.

Fixed at its lower end in this plate 14, centrally thereof, is a vertical rod 16 which passes freely upward through an aperture 17 in the cross bar 13. Upon the upper portion of this rod 16, above the cross bar 13, is adjustably mounted a weight 18 which is here in the form of a sleeve like member through which the rod is passed freely.

This weight 18 is adapted for adjustable positioning vertically along the rod 16 and to this end the latter is formed with a series of vertically spaced notches 19 which are adapted to be engaged by a stud 20 carried by the weight 18. This stud is here shown as projecting inwardly through a hole 21 in the side wall of the weight 18 and being fixed at its outer end to the lower end of a lever 22 which extends along the weight 18 in a generally vertical direction, and is fulcrumed between its ends as at 23 to and between a pair of lugs 24 formed on the side of the weight. Bearing upon the upper end of the lever 22, in a manner to hold the stud 20 in engagement with the rod 16, is a coiled expansion spring 25 which is held in a socket 26 in the side of the weight.

For holding the weighted plate 14 in raised position a cord 30 is attached to the rod 16 just above the plate, this cord passing upwardly through an aperture 31 in the cross bar 13 and then downwardly to connect to a retaining member at its opposite end. This retaining member is here in the form of a pointed bar 32 maintained in operative position by a trigger on the bait holding device.

The bait holding device comprises a pan 35 hinged at one side as at 36 to the bottom 10 of the box and having a rigid arm 37 extending outwardly through a vertical slot 38 in the box to be engaged by bar 32, a socket 39 in the side wall of the box at the upper end of the slot forming an abutment seat for the bar. I preferably form this arm 37 of a wire doubled and twisted as shown, the central part of the wire forming the outer end of the arm while the ends of the wire, which form the inner end of the arm, are separated from one another and bent upwardly to form hooks 40 to which the bait, indicated at 41, may be secured. The arm may be secured to the pan in any suitable manner, as by the staples 42. The outer end of the arm 37 is in the form of a loop 43 around which is wound a cord or thread 44 which forms the trigger of the device.

The trap is set by raising the plate 14 and setting the bar 32 with its butt end in the socket 39 and its pointed forward end engaged between the turns of the cord or thread 44, the parts being so proportioned that the pan 35 is somewhat raised, while the bar 32 has a downward and outward inclination when in this position.

As will be apparent, the pull of the cord 30 acts on the bar 32 in a manner to retain its pointed end from disengagement with the cords 44, but if the pan 35 is depressed the cords 44 will disengage from the bar and the plate 14 will be free to drop.

It will be understood that a series of different weights 18 may be provided which may be employed as desired, also that the weight 18 may be adjusted along the rod 16 so as to allow the plate 14 to descend sufficiently to crush the animal or not, as may be desired.

Having thus described my invention what I claim as new and desire to protect by Letters Patent of the United States is as follows:

1. A trap comprising an open-topped box, guides extending upwardly therefrom, a horizontal plate slidable vertically in said guides, a bait holding device, and means in operative relation with said bait holding device for holding said plate in raised position, and means adjustably limiting the downward movement of said plate.

2. A trap comprising an open-topped box, guide posts extending upwardly from the sides thereof, a cross bar connecting the upper ends of said guide posts, a horizontal plate slidably guided by said posts, a rod extending upwardly from said plate through said cross bar, a weighted sleeve slidable on said rod, said rod having a series of longitudinally spaced notches, a latching element on said sleeve adapted to engage in a selected one of said notches, a bait-holding device, and means in operative relation with said bait holding device for holding said plate in raised position.

3. A trap comprising an open-topped box, guide posts extending upwardly from the sides thereof, a cross bar connecting the upper ends of said guide posts, a horizontal plate slidably guided by said posts, a rod extending upwardly from said plate through said cross bar, a weighted sleeve slidable on said rod, said rod having a series of longitudinally spaced notches, a latching element on said sleeve adapted to engage in a selected one of said notches, a bait holding device, and means in operative relation with said bait holding device, for holding said plate in raised position, said means including a cord connected to said plate at one end and passing first upwardly and then downwardly, a pointed bar having the cord connected thereto between its ends, a socket in the side of the box for receiving the butt end of the pointed bar, a pan in the box, and a trigger arm on said pan adapted to engage the pointed end of the said bar.

In testimony whereof I have affixed my signature.

MICHAEL SHUTOFF.